F. D. BROWN & W. D. WHITNEY.
VEHICLE SUSPENSION.
APPLICATION FILED MAR. 16, 1908.

923,764.

Patented June 1, 1909.
2 SHEETS—SHEET 1.

WITNESSES
O. T. Palmer
M. Hamilton

INVENTORS
Frederic D. Brown
Walter D. Whitney
by their Attorney
James Hamilton

F. D. BROWN & W. D. WHITNEY.
VEHICLE SUSPENSION.
APPLICATION FILED MAR. 16, 1908.

923,764.

Patented June 1, 1909.

2 SHEETS—SHEET 2.

WITNESSES
A. T. Palmer
M. Hamilton

INVENTORS
Frederic D. Brown
Walter D. Whitney
by their Attorney
James Hamilton

UNITED STATES PATENT OFFICE.

FREDERIC D. BROWN AND WALTER D. WHITNEY, OF MINNEAPOLIS, MINNESOTA.

VEHICLE SUSPENSION.

No. 923,764.          Specification of Letters Patent.          Patented June 1, 1909.

Application filed March 16, 1908. Serial No. 421,329.

*To all whom it may concern:*

Be it known that we, FREDERIC D. BROWN and WALTER D. WHITNEY, citizens of the United States, residing at Minneapolis, in the county of Hennepin and State of Minnesota, have invented certain new and useful Improvements in Vehicle Suspensions, of which the following is a specification, reference being had to the accompanying drawings.

Our invention relates to improvements in road vehicles; and an object of our invention is to provide means which will dispense with the pneumatic tires now so commonly used without sacrificing resiliency of action and capacity to absorb shocks.

Figure 1:
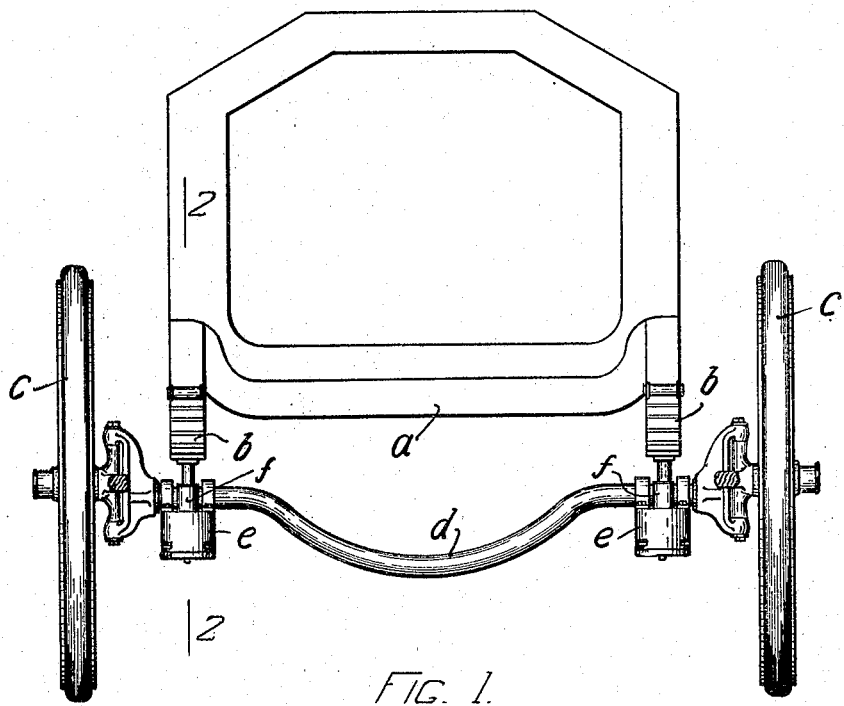
Figures 2, 3:
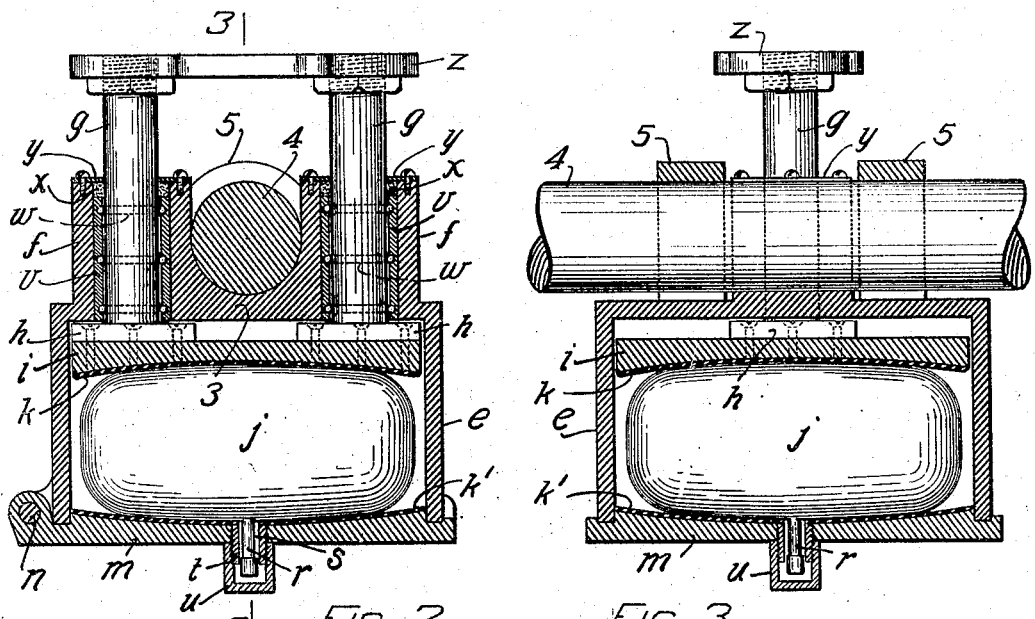
Figure 4:
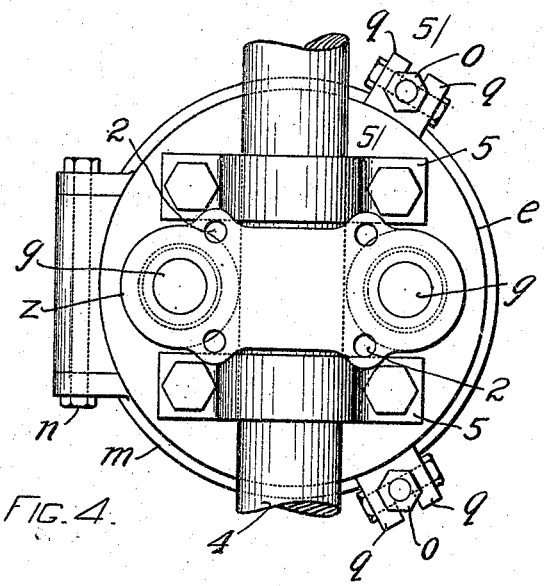
Figure 5:
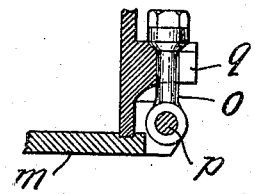
Figure 6:
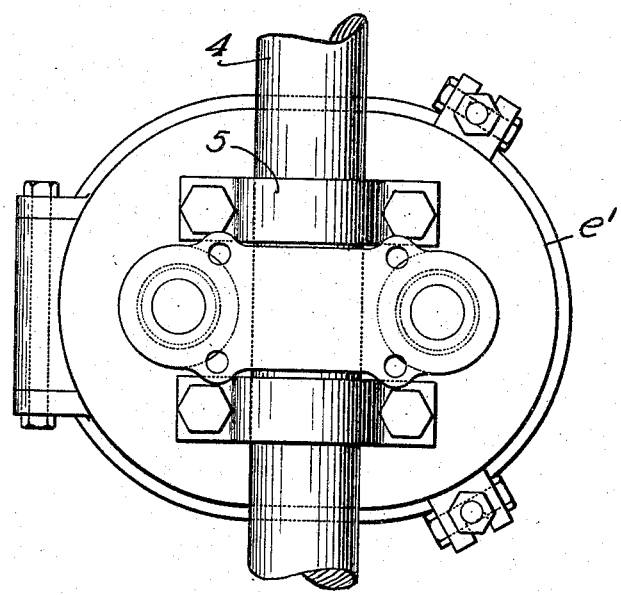

In the drawings illustrating the principle of our invention and the best mode now known to us of applying that principle, Figure 1 is a front elevation of a road vehicle fitted with our new vehicle suspension; Fig. 2 is a section through our vehicle suspension on the line 2, 2, of Fig. 1; Fig. 3 is a section on the line 3, 3 of Fig. 2; Fig. 4 is a top or plan view of what is shown in Fig. 3; Fig. 5 is a detail of a locking device; and Fig. 6 shows a modified form of our vehicle suspension in which the cushion-box is made elliptical.

The road vehicle is provided with the usual body $a$, supported upon springs $b$, wheels $c$, and axle $d$. Our new vehicle suspension is fitted between the springs $b$ and axle $d$. The cushion-box $e$ is formed at the top with two cylinders $f$ within which work plungers each of which is provided with a plunger-base $h$. The plunger bases $h$ are fastened upon a plate $i$ between which and the air-bag $j$ is interposed a rubber mat $k$. The bottom $m$ of the cushion-box $e$ is hinged thereto at $n$ and is locked in closed position by means of two headed latches $o$ (Figs. 4 and 5) pivotally mounted at $p$ on the hinged bottom $m$ and adapted to engage between the lugs $q$ which project from the cylindrical wall of the cushion-box $e$. A heavy rubber mat $k'$ is interposed between the hinged bottom $m$ and the air-bag $j$. The latter is provided with a valved nipple $r$ which extends through a small opening $s$ in the hinged bottom $m$. The hole $s$ is provided with a lining $t$ which projects downwardly beyond the outer face of the bottom $m$ and is threaded to receive the screw-cap $u$. Each cylinder $f$ is provided with a removable lining $v$ formed on its interior with several circular grooves $w$ adapted to receive steel balls, in order to lessen the frictional resistance to the movement of the plunger-rods or posts $g$. To exclude grit the upper ends of the cylinders $f$ are closed by packings $x$ held by the cover-plates $y$. To the top of the plunger-posts $g$ is secured a seat-plate $z$ upon which rest the springs $b$. The latter are fastened to the seat-plate $z$ by means of bolts passing through the holes 2.

Between the plunger-cylinders $f$ is provided an axle-box 3 through which passes the axle end 4. The latter is held firmly by means of cap-plates 5. The cross-section of the axle end may vary.

The heavy rubber mats $k$, $k'$ serve to prevent wear of the air-bag $j$ and thereby to lengthen the life of the latter. Any suitable material may be used as a substitute for rubber in their construction.

In the operation of our device, as the wheels $c$ pass over inequalities of the road and obstructions therein, the axles $d$ rise and fall and in so doing carry the cushion-box $e$ with them. Before the movement of the cushion-box $e$ can be transmitted to the spring $b$, the air-bag $j$ must be compressed, whereby shocks due to the sudden meeting of obstructions in the roadway are absorbed. Our vehicle suspension avoids the danger incident to the use of pneumatic tires. If the air-bag $j$ should burst, the spring-seat $z$ will simply settle onto the tops of the cylinders $f$ and the vehicle will not be thrown out of its course. Further, there will be no need of immediately making repairs as in the case where a pneumatic tire bursts. A worn-out air-bag is easily replaced without jacking up the vehicle as must be done when a pneumatic tire is to be replaced. To replace the air-bag $j$, the hinged bottom $m$ is released and allowed to drop; the new air-bag is substituted for the one worn out; the bottom $m$ is closed and locked in place and the new air-bag is inflated, whereby the car-top $a$ is raised to its proper level again.

Fig. 6 shows that the cushion-box $e'$ may be elongated; that is, have one axis longer than the other. In this case, the longer axis lies at right angles to the line of the axle, in order that sufficient bearing surface may be given the air-bag without having the dimension parallel to the axis excessive.

We claim:

1. In a vehicle suspension, the combination of a cushion-box formed with cylinders; plunger devices slidably mounted therein; friction-reducing devices mounted in said cylinders around said plunger devices; and a cover for the top of each of said cylinders.

2. In a vehicle suspension, the combination of a cushion-box formed with cylinders; plunger devices slidably mounted therein; friction-reducing devices mounted in said cylinders around said plunger devices; packing near the top of said cylinders; and a cover over said packing for each of said cylinders.

3. In a vehicle suspension, the combination of a cushion-box, an inflatable air-bag mounted therein and provided with a nipple, and plunger devices mounted free to slide in and out of said cushion-box; the side of said cushion-box opposed to the inner faces of said plunger devices being removable and formed with an opening through which access may be gained to said nipple, whereby said air-bag may be readily removed, replaced and inflated while said plunger devices are in their innermost position.

In testimony whereof we have hereunto set our hands at said Minneapolis this 10th day of March, A. D. 1908, in the presence of the two undersigned witnesses.

FREDERIC D. BROWN.
WALTER D. WHITNEY.

Witnesses:
BARRY DIBBLE,
BREWER GOODSELL.